United States Patent
Ishizaki (10) Patent No.: US 10,335,908 B2
(45) Date of Patent: Jul. 2, 2019

(54) ROTARY TABLE DEVICE

(71) Applicant: TSUDAKOMA KOGYO KABUSHIKI KAISHA, Kanazawa-shi, Ishikawa-ken (JP)

(72) Inventor: Junichiro Ishizaki, Kanazawa (JP)

(73) Assignee: TSUDAKOMA KOGYO KABUSHIKI KAISHA, Kanazawa-Shi (JP)

( * ) Notice: Subject to any disclaimer, the term of this patent is extended or adjusted under 35 U.S.C. 154(b) by 0 days.

(21) Appl. No.: 15/047,867

(22) Filed: Feb. 19, 2016

(65) Prior Publication Data
US 2016/0256969 A1 Sep. 8, 2016

(30) Foreign Application Priority Data
Mar. 3, 2015 (JP) ................................. 2015-040827

(51) Int. Cl.
*B23Q 1/38* (2006.01)
*B23Q 1/52* (2006.01)
*B23Q 16/10* (2006.01)

(52) U.S. Cl.
CPC ............... *B23Q 1/38* (2013.01); *B23Q 1/522* (2013.01); *B23Q 16/105* (2013.01)

(58) Field of Classification Search
CPC ......... B23Q 1/38; B23Q 1/522; B23Q 16/105
See application file for complete search history.

(56) References Cited

U.S. PATENT DOCUMENTS 5,072,651 A * 12/1991 Kagita ................. B23Q 1/28
                                                     188/151 R
7,418,889 B2 * 9/2008 Nitta ................... B23Q 1/28
                                                     74/813 L

FOREIGN PATENT DOCUMENTS

| JP | H03-120354 U | 12/1991 |
| JP | 2002-354778 | 12/2002 |
| JP | 2005-138216 A | 6/2005 |
| JP | 2010-099789 | 5/2010 |

OTHER PUBLICATIONS

Japanese Notification of Reasons for Refusal, English translation included, dated Sep. 12, 2018, 5 pages.

* cited by examiner

*Primary Examiner* — David P Bryant
*Assistant Examiner* — Nirvana Deonauth
(74) *Attorney, Agent, or Firm* — Rankin, Hill & Clark LLP

(57) ABSTRACT

A rotary table device for a machine tool includes a main shaft that is rotatably supported in an insertion hole formed in a frame; a table that is secured to an end side of the main shaft, and on which a workpiece, serving as an object to be processed, is mounted; a clamp piston that is provided so as to be movable in an axial direction of the main shaft in the insertion hole; and a bearing that is provided between the table and the frame, and that directly supports the table with respect to the frame. The main shaft has a clamp surface facing the table. A pressure chamber is defined by the frame and the clamp piston. When an operating fluid is supplied to the pressure chamber, the clamp piston is caused to press-contact the clamp surface, so that the table is brought into a clamped state.

3 Claims, 4 Drawing Sheets

ROTARY TABLE DEVICE

BACKGROUND OF THE INVENTION

1. Field of the Invention

The present invention relates to a rotary table device for a machine tool including a main shaft that is rotatably supported in an insertion hole in a frame, a table that is secured to an end side of the main shaft and on which a workpiece, which serves as an object to be processed, is mounted, and a clamp piston that is provided so as to be movable in an axial direction of the main shaft in the insertion hole.

2. Description of the Related Art

As such a rotary table device for a machine tool described above, a rotary table device disclosed in Japanese Unexamined Utility Model Registration Application Publication No. 03-120354 (Patent Literature (PTL) 1) is provided. More specifically, PTL 1 discloses a rotary table device including a main shaft (output shaft) that is rotatably supported in an insertion hole (void) in a frame (housing), a table (indexing table) that is secured to an end side of the main shaft and on which a workpiece, which serves as an object to be processed, is mounted, and a clamp piston (cylinder) that is movable in an axial direction in the insertion hole.

In the rotary table device disclosed PTL 1, the main shaft has a clamp surface (friction surface) facing the table; the clamp piston and a member (piston) secured to the frame define a pressure chamber; and, when an operating fluid is supplied to the pressure chamber, the clamp piston is caused to press-contact the clamp surface, so that the table is brought into a clamped state. In the rotary table device in PTL 1, a bearing is provided between the frame and the main shaft, and the bearing rotatably supports the table through the main shaft.

As such a rotary table device, there is a type in which a workpiece that is mounted on the table while the workpiece is placed on the table is processed by a machine tool. Types of such processing include what is called positioning processing in which the table is brought into a clamped state at an indexed angular position, and what is called contouring processing in which a workpiece is processed while the table is rotated without bringing the workpiece into a clamped state (that is, the table is brought into an unclamped state). In the rotary table device, the positioning processing and the contouring processing may be successively performed on the mounted workpiece. In other words, it may be necessary for one rotary table device to be formed so as to be capable of performing both the positioning processing and the contouring processing.

In the rotary table device disclosed in PTL 1, there is a problem in such processing, in particular, the positioning processing, performed on a workpiece in that the processing precision thereof is reduced to an unallowable precision. This is described in more detail below.

Ordinarily, when processing a workpiece mounted on the table of the rotary table device, an outside force (cutting force) generated by a tool or the like acts upon the workpiece. Therefore, in the rotary table device, due to the cutting force that acts upon the workpiece when the processing is performed, a moment around an axis that crosses a rotation axis of the table acts upon a portion that supports the table (supporting structure). However, since, in general, in the contouring processing, light cutting is often performed as finishing processing or the like, the cutting force that acts upon the workpiece when the contouring processing is performed is relatively small, so that the moment that acts upon the supporting structure is relatively small.

However, in the positioning processing, heavy cutting, such as rough processing or the like, is often performed. Therefore, the cutting force that acts upon the workpiece when the positioning processing is performed is larger than that when the contouring processing is performed. Consequently, when the positioning processing is performed, the moment that acts upon the supporting structure of the table is large.

For this case, as described above, in the rotary table device in PTL 1, a bearing is provided between the frame and the main shaft, and a supporting structure is one in which the table is indirectly supported by the frame through the main shaft. Therefore, in the positioning processing, such a large moment mentioned above acts upon the supporting structure, as a result of which the main shaft is flexed. The flexing of the main shaft may cause the table to be brought into a tilted state. Such tilting of the table may cause the precision with which the workpiece is processed to be reduced to an unallowable precision.

As such a rotary table device for a machine tool described above, a rotary table device having a structure disclosed in Japanese Unexamined Patent Application Publication No. 2005-138216 (Patent Literature (PTL) 2) is provided. In the rotary table device disclosed in PTL 2, a bearing for supporting a table is provided directly below the table and between the table and a frame. That is, in the rotary table device in PTL 2, a supporting structure for supporting the table is one in which the table is directly supported by the frame. Therefore, in the rotary table device in PTL 2, when the positioning processing is performed, a state in which the table is tilted by flexing of a main shaft, such as that described above, does not occur.

The bearing is disposed in the rotary table device in PTL 2 as described above on the assumption that a structure for bringing the table into a clamped state (clamp structure) differs from that of the rotary table device in PTL 1. That is, in the rotary table device in PTL 2, the table is provided so as to be movable in the axial direction of the main shaft, and a clamp surface is formed at a lower surface of the table. In causing the table to be in a clamped state, the table is displaced towards the frame, and the lower surface (clamp surface) of the table is caused to press-contact the frame. In PTL 2, with the rotary table device being assumed as having such a clamp structure, when rotationally driving the table (that is, unclamping the table), for preventing the table and the frame from slide-contacting each other, the clamp surface of the table is set away from the frame and, in this state, the bearing is disposed as described above such that the table is easily rotated.

Incidentally, the rotary table device in PTL 2 is basically formed only for performing positioning processing, that is, the rotary table device in PTL 2 is not formed for performing contouring processing such as that described above. More specifically, the rotary table device in PTL 2 has a structure in which, as described above, the unclamped table is displaced towards the frame to bring the table into a clamped state. In the axial direction of the main shaft, the position of the upper surface of the table (that is, the position of a workpiece) when the table is clamped differs from that when the table is unclamped. Therefore, when one tries to perform contouring processing with the rotary table device having such a structure, the processing standard when the contouring processing is performed differs from that when positioning processing is performed. Therefore, processing control (NC control) becomes complicated.

Moreover, in the rotary table device in PTL 2, in order for the table to be displaceable as described above, in addition to the bearing, an urging device, such as a compression coil spring, is interposed between the table and the frame. When rotationally driving the table (that is, unclamping the table), the table is supported by the frame with the urging device interposed therebetween. That is, in the rotary table device in PTL 2, when the table is in an unclamped state in which the table is rotationally driven, the table is elastically supported by the frame. Therefore, when contouring processing is performed in the rotary table device having such a structure, the table is tilted by the cutting force acting upon the table through the workpiece, as a result of which the precision with which the workpiece is processed is considerably reduced. Therefore, due to these points, it can be said that the rotary table device in PTL 2 is formed only for positioning processing.

SUMMARY OF THE INVENTION

In view of the structures of such existing rotary table devices described above, it is an object of the present invention to provide a rotary table device that is capable of performing both positioning processing and contouring processing, such as those described above, and that is capable of minimizing a reduction in the precision with which a workpiece is processed when the positioning processing is performed.

The present invention presupposes a rotary table device for a machine tool including a main shaft that is rotatably supported in an insertion hole formed in a frame; a table that is secured to an end side of the main shaft, and on which a workpiece, which serves as an object to be processed, is mounted; and a clamp piston that is provided so as to be movable in an axial direction of the main shaft in the insertion hole. The main shaft has a clamp surface that faces the table. A pressure chamber is defined by the frame and the clamp piston. When an operating fluid is supplied to the pressure chamber, the clamp piston is caused to press-contact the clamp surface, so that the table is brought into a clamped state.

To the above-described end, with the above-described structure of the rotary table device being assumed, the rotary table device for a machine tool that the present invention presupposes includes a bearing that is provided between the table and the frame, and that directly supports the table with respect to the frame.

According to the rotary table device for a machine tool of the present invention, when the frame includes a body portion that is mounted on the machine tool and a cylinder portion that is secured to the body portion so as to be positioned between the table and the clamp piston in the axial direction in the body portion, and at least part of the pressure chamber is defined by the clamp piston and the cylinder portion, the bearing may be provided between the table and the cylinder portion, and the table may be supported by the cylinder portion of the frame with the bearing interposed between the table and the cylinder portion. Further, in this structure, at least part of the bearing may be provided so as to be positioned within a range of existence of the pressure chamber in a radial direction of the main shaft.

In the rotary table device for a machine tool that the present invention presupposes, as described above, the clamp structure for bringing the table into a clamped state is one in which the clamp piston that is provided so as to be movable in the axial direction of the main shaft is caused to press-contact the clamp surface of the main shaft, and in which, in the axial direction of the main shaft, the position of the table when the table is clamped and the position of the table when the table is unclamped do not differ from each other. Therefore, it is possible to perform contouring processing in addition to positioning processing.

Moreover, according to the rotary table device of the present invention, a bearing for rotatably supporting the table with respect to the frame is provided between the table and the frame, and the table is directly supported with respect to the frame by the bearing. In addition, the bearing that is set at the frame is capable of directly receiving a surface of the table facing the frame in the axial direction of the main shaft. Therefore, even if the aforementioned moment acts upon, for example, the table due to cutting force acting upon a workpiece when the processing is performed, the table is almost never tilted, so that a reduction in the precision with which the workpiece is processed, which is caused by the tilting of the table, can be minimized.

In particular, when positioning processing that is performed while the table is clamped is performed, as described above, a large cutting force acts upon the workpiece, as a result of which a large moment, such as that mentioned above, acts upon, for example, the table. When the table is clamped, a push force that causes the clamp piston to push the clamp surface causes a force that is directed towards the frame (that is, in the direction of the bearing) to act upon the table via the main shaft. This causes the table to push the bearing, and this force to be received by the frame. As a result, the support rigidity of the bearing becomes higher. Therefore, even if a large moment, such as that mentioned above, acts upon the table, the tilting of the table is minimized, so that a reduction in the processing precision is reduced.

In the rotary table device according to the present invention, when the frame includes a body portion and a cylinder portion, such as those described above, providing the bearing between the table and the cylinder portion makes possible the following. That is, when the table is clamped, the flexing of the table caused by the action of the push force is small, so that a reduction in the precision with which the workpiece is processed can be further reduced. This is described in more detail below.

In the above-described rotary table device that the present invention presupposes, the clamp piston is pushed against the clamp surface facing the table by the pressure of an operating fluid that is supplied to the pressure chamber. Therefore, the pressure chamber is formed so as to include a table-side surface of the clamp piston. With this being assumed, in the rotary table device, the frame includes, in addition to the body portion that is an independent portion thereof and that has an outer peripheral wall in which the insertion hole is formed, the cylinder portion that is secured to the body portion and that faces the table-side surface of the clamp piston in the axial direction of the main shaft such that at least part of the pressure chamber is formed by the cylinder portion and the table-side surface of the clamp piston. In the case of this structure, the cylinder portion is obviously positioned at an inner side of the outer peripheral wall of the body portion in a radial direction of the table at the body portion (that is, inside the insertion hole). Further, in the above-described rotary table device according to the present invention, the bearing is provided between the table and the frame (the body portion, cylinder portion) having the above-described structure.

In the rotary table device that the present invention presupposes, as described above, when the table is clamped, the clamp piston causes a push force to act upon the clamp surface, so that a force in the direction of the push force acts upon the table through the main shaft. In this case, when such a force acts upon the table, the table may be flexed such that the amount by which an inner side (center side) of the table in the radial direction thereof is displaced in the direction in which the force acts in the axial direction of the main shaft is greater than that by which an outer side (outer peripheral edge side) of the table in the radial direction thereof is displaced in the direction in which the force acts in the axial direction of the main shaft. In addition, when the table is flexed, the precision with which the workpiece is processed is reduced when positioning processing that is performed while the table is clamped is performed.

In contrast, in the rotary table device according to the present invention, the bearing is positioned between the table and the cylinder portion of the frame having the above-described structure, so that the position where the table is supported by the bearing is closer to the center of the table. Therefore, even if such a force mentioned above acts upon the table, the amount of flexing of the table occurring when the aforementioned force acts upon the table is small. As a result, the displacement of the workpiece caused by the flexing of the table when positioning processing is performed is small, so that a reduction in the precision with which the workpiece is processed can be further reduced.

Further, in the structure in which the bearing is disposed between the cylinder portion and the table as described above, when the bearing is disposed such that at least part of the bearing is positioned within the range of existence of the pressure chamber in a radial direction of the main shaft, a reduction in the precision with which the workpiece is processed can be further reduced when the positioning processing is performed. This is described in more detail below.

As described above, when the bearing is disposed between the table and the cylinder portion of the frame, the cylinder portion is provided for supporting the table with the bearing interposed therebetween. Therefore, obviously, the cylinder portion has high rigidity that allows the table to be supported without displacing the table in the axial direction.

However, as described above, the cylinder portion forms, along with the clamp piston, the pressure chamber, and is provided between the main shaft and the body portion of the frame in the radial direction of the main shaft, so that the cylinder portion is supported in a cantilever manner with respect to the body portion. Further, since the cylinder portion is provided in the insertion hole in the body portion where, for example, the clamp piston is disposed, restrictions are placed on, for example, the thickness of the cylinder portion in the axial direction. Consequently, even if, as described above, in order to reduce the flexing of the table itself, the bearing is disposed between the cylinder portion and the table, and the cylinder portion itself is designed to have high rigidity, the following occurs. That is, as described above, if, when positioning processing is performed, a large cutting force acts upon the workpiece and this force acts upon the bearing through the table to cause the bearing to push the cylinder portion by such a large force, the cylinder portion, itself, that supports the table is slightly flexed. This causes the table to be displaced, as a result of which the precision with which the workpiece is processed may be reduced.

However, as described above, since the cylinder portion forms, along with the clamp piston, at least part of the pressure chamber, when an operating fluid is supplied to the pressure chamber for bringing the table (main shaft) into a clamped state, the pressure of the operating fluid acts not only upon the clamp piston but also upon the cylinder portion. Therefore, when positioning processing is performed, a large force, such as that mentioned above, is applied to the cylinder portion from the bearing, whereas the pressure of the operating fluid acts upon a surface of the cylinder portion that is situated at a side opposite to a surface of the cylinder portion that supports the bearing (surface that receives the force from the bearing). Therefore, the amount of such flexing of the cylinder portion itself mentioned above is smaller than that when a large force, such as that mentioned above, simply acts upon the cylinder portion.

With this being assumed, when the bearing is positioned such that at least part of the bearing is positioned within the range of existence of the pressure chamber in the radial direction of the main shaft, the cylinder portion is supported such that the cylinder portion receives the pressure of the operating fluid and opposes the force applied from the bearing in a receiving direction within the range of existence of the pressure chamber. Therefore, at least part of the force that acts upon the cylinder portion from the bearing can be received within the supported range. Consequently, such flexing of the cylinder portion itself mentioned above is further reduced, so that a reduction in the precision with which the workpiece is processed when the positioning processing is performed can be further reduced.

DESCRIPTION OF THE PREFERRED EMBODIMENTS

An exemplary rotary table device for a machine tool according to the present invention is hereunder described with reference to the drawings. In the description below, the term "axial direction" refers to the direction of an axis of a main shaft, and the term "radial direction" refers to a radial direction of the main shaft and a table that are concentrically disposed.

Figure 1:
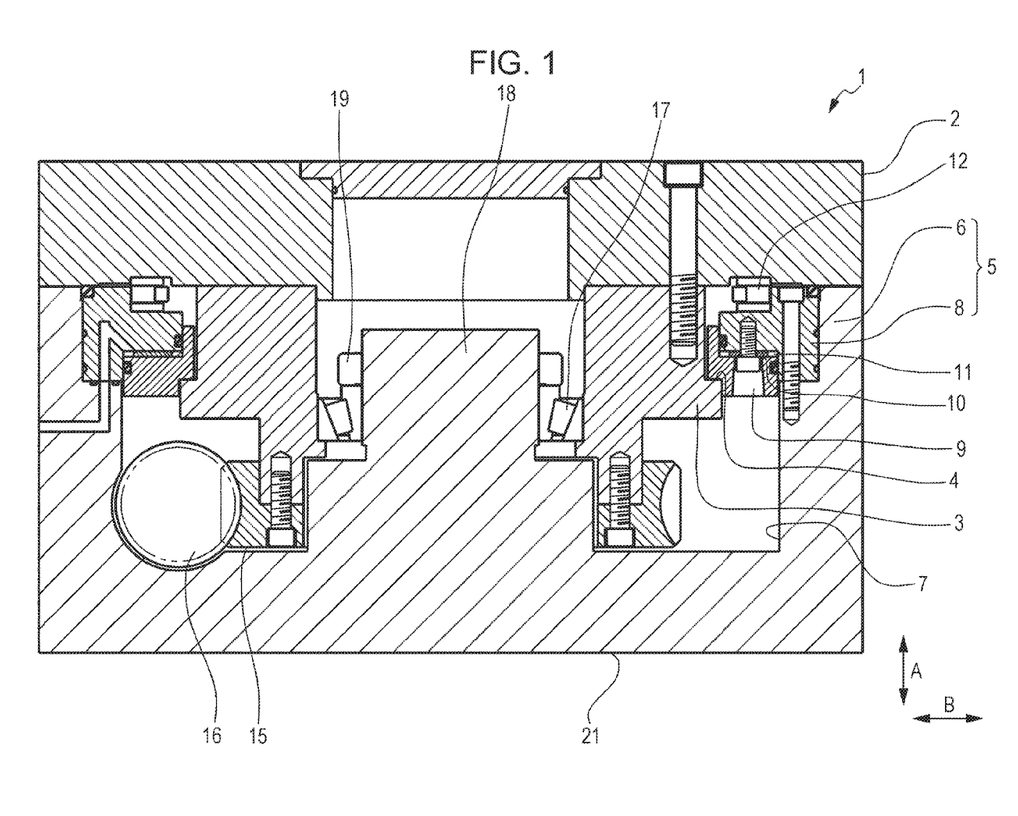
FIG. 1 is a side sectional view of an embodiment of a rotary table device for a machine tool according to the present invention.
Figure 2:
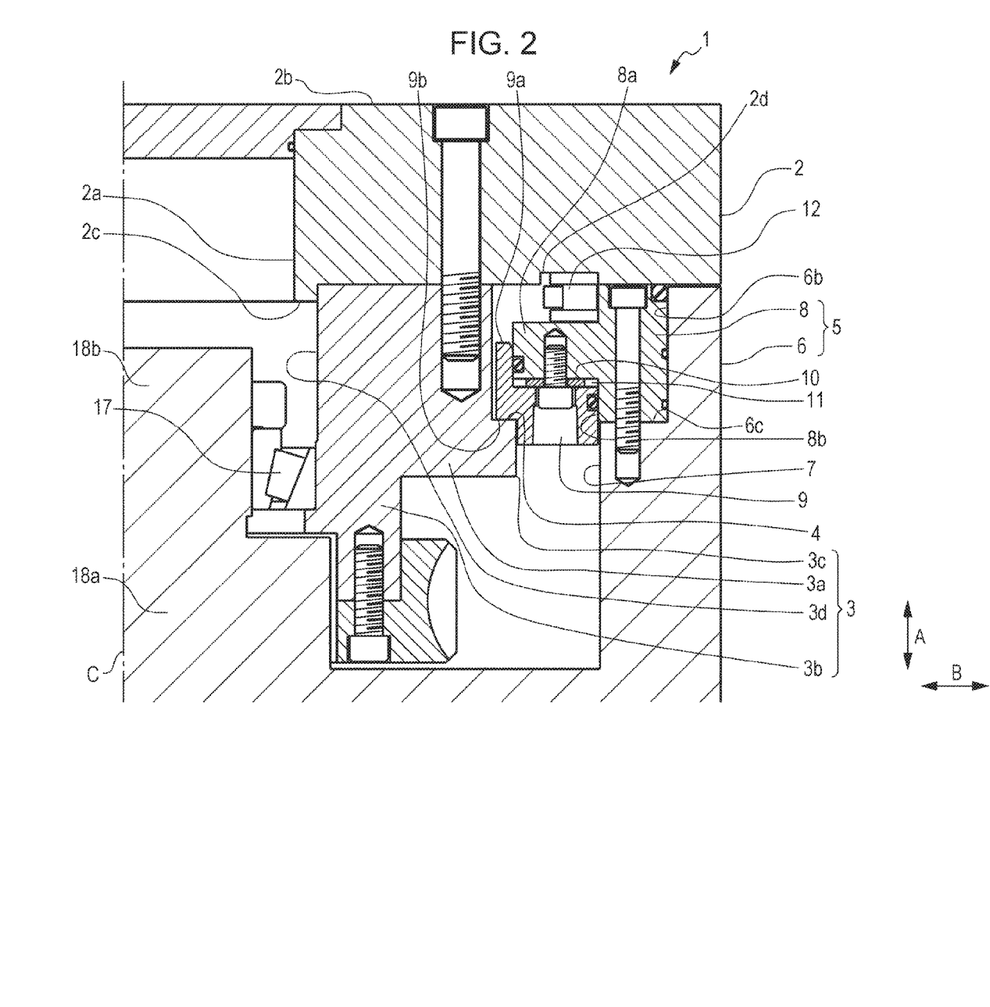
FIG. 2 is an enlarged partial sectional view of a main portion shown in FIG. 1.

FIGS. 1 and 2 each show a rotary table device 1 for a machine tool to which the present invention is applied. As shown in FIGS. 1 and 2, the rotary table device 1 includes a frame 5 that is mounted on the machine tool, a main shaft 3 that is rotatably mounted on the frame 5, and a table 2 that is mounted on one end portion of the main shaft 3 so as to be unrotatable relative to the main shaft 3.

More specifically, the frame 5 has a structure in which a setting surface 21 for setting the machine tool is flat, and in which an insertion opening 7 that opens in a surface thereof at a side opposite to the setting surface 21 in the axial direction is formed. The insertion hole 7 is a bottomed hole at a side of the setting surface. Further, in the rotary table device 1 according to the embodiment, the frame 5 includes a circular cylindrical shaft portion 18 that extends in the axial direction from the bottom surface forming the insertion hole 7 and that is concentrically formed with the insertion hole 7. As shown in FIGS. 1 and 2, the shaft portion 18 includes a base portion 18a that is continuously formed with the bottom surface and a supporting portion 18b that is formed closer to a side opposite to the bottom surface than the base portion 18a and whose diameter is smaller than that of the base portion 18a. The supporting portion 18b of the shaft portion 18 is provided with a male screw (not shown) at an outer peripheral surface of an end portion at the side opposite to the bottom surface.

In the embodiment, the main shaft 3 is a cylindrical shaft whose outside diameter is larger than that of the shaft portion 18 of the frame 5 and that has a through hole 3d that extends through the main shaft 3 in the axial direction. However, the inside diameter of the through hole 3d is slightly larger than the outside diameter of the shaft portion 18 (base portion 18a) of the frame 5.

The main shaft 3 is formed such that the outside diameter of a portion disposed closer to an end side than an intermediate portion in the axial direction is larger than the outside diameter of a portion disposed closer to the other end side than the intermediate portion in the axial direction. A large-diameter portion 3a is formed at the one end side of the main shaft 3, and a small-diameter portion 3b is formed at the other end side of the main shaft 3. The large-diameter portion 3a has a flange 3c that is provided at a small-diameter-portion-side end portion of the large-diameter portion 3a and that has an outside diameter that is larger than the outside diameters of portions other than this portion at the small-diameter-portion side. However, the outside diameter of the large-diameter portion 3a including the flange 3c is smaller than the inside diameter of the insertion hole in the frame 5. An end surface 4, which is situated at a side opposite to the small-diameter portion, of end surfaces of the flange 3c that crosses the axial direction is formed as a planar surface that is orthogonal to the axial direction.

With the small-diameter-portion side of the main shaft 3 being at the bottom-surface side of the insertion hole 7 in the frame 5, the main shaft 3 is provided in the insertion hole in the frame 5 such that the shaft portion 18 of the frame 5 is positioned in the through hole. With this being assumed, a first bearing 17, such as a circular conical roller bearing, is interposed between the main shaft 3 (inner peripheral surface forming the through hole 3d) and the shaft portion 18 of the frame 5. This causes the main shaft 3 to be rotatably supported with respect to the frame 3. The first bearing 17 is provided for primarily supporting a load in the radial direction. The first bearing 17 has a structure in which the displacement of an outer ring thereof with respect to an inner ring thereof towards one side in the axial direction (towards the base portion of the shaft portion 18 in the embodiment) is not restricted. In the axial direction, the first bearing 17 is disposed between a projecting portion of the main shaft 3 that protrudes into the through hole and a nut 19 that is screwed onto the supporting portion 18b of the shaft portion 18 of the frame 5, and the nut 19 is tightened with respect to the first bearing 17. This causes the position of the first bearing 17 to be fixed.

The table 2 is a disc-shaped member whose outside diameter is larger than the inside diameter of the insertion hole 7 in the frame 5, and has a through hole (center hole 2a) in the center thereof. One of two end surfaces of the table 2 that crosses the axial direction of the table 2 serves as a placement surface 2b for mounting, for example, a workpiece, which serves as an object to be processed, thereon. The other end surface is where a fitting portion 2c protruding in the axial direction is provided around the center hole 2a. With the table 2 being positioned by fitting the fitting portion 2c into the through hole 3d of the main shaft 3, the table 2 is mounted on one end side of the main shaft 3, and is secured to the main shaft 3 with a plurality of bolts so as to be unrotatable relative to the main shaft 3.

The rotary table device 1 further includes a worm wheel 15 that is mounted on an end portion of the small-diameter portion 3b of the main shaft 3 at a side opposite to the table so as to be unrotatable relative to this end portion, and a worm spindle 16 that is supported by the frame 5 so as to be rotatable with respect to the frame 5 and that engages the worm wheel 15. The rotary table device 1 has a structure in which, by rotationally driving the worm spindle 16 by a driving motor (not shown), the main shaft 3 (the table 2) is rotationally driven through the worm wheel 15, and, by controlling the amount of rotation of the driving motor, the angular position of the table 2 is indexed.

With this being assumed, the rotary table device 1 includes a clamping device for bringing the table 2 into a clamped state at the angular position indexed as described above. However, in the rotary table device 1 that the present invention presupposes, the clamping device is provided for, by supplying an operating fluid to a pressure chamber 11, causing a clamp piston 9 to be pushed against a clamp surface of the main shaft 3, and bringing the table 2 into a clamped state. Therefore, the clamping device includes the clamp piston 9 that is provided so as to be movable in the axial direction of the main shaft 3 in the insertion hole in the frame 5. In the rotary table device 1 according to the embodiment, as a structure for forming the pressure chamber 11, the frame 5 includes an annular cylinder portion 8 that is mounted on a body portion 6 serving as an independent portion of the frame 5. That is, the frame 5 of the rotary table device 1 according to the embodiment includes the body portion 6 and the cylinder portion 8. This is described in more detail below.

The body portion 6 of the frame 5 is an independent portion of the frame 5 including a portion that is an outer peripheral wall of the frame 5 (hereunder referred to as the "outer peripheral wall"). A side of the outer peripheral wall that is opposite to a setting surface (that is, a table side) is thin-walled. A stepped portion 6c is formed in a hole that is defined by the outer peripheral wall. In addition, the body portion 6 includes a portion (diameter-increasing portion 6b) where the inside diameter of the hole increases at an end portion of the frame 5 at the side opposite to the setting surface. With this being assumed, in the hole in the body portion 6, while the cylinder portion 8 is fitted to the diameter-increasing portion 6b and is in contact with a table-side surface of the stepped portion 6c, the cylinder portion 6 is mounted on the body portion 6 with a plurality of mounting bolts.

As described above, the cylinder portion 8 is an annular member, and has a through hole that is situated at an inner side thereof and that has an inside diameter that allows the main shaft 3 to be disposed. As described above, the cylinder portion 8 is mounted on the body portion 6 and is integrated with the body portion 6. However, the inside diameter of the through hole in the cylinder portion 8 is smaller than the inside diameter of a portion excluding the diameter-increasing portion 6b at the hole in the body portion 6. In the embodiment, as shown in FIGS. 1 and 2, the inside diameter of the through hole in the cylinder portion 8 is substantially the same as the outside diameter of the flange 3c of the main shaft 3. Therefore, as described above, while the cylinder portion 8 is mounted on the body portion 6 (mounted state), in the radial direction, the cylinder portion 8 protrudes inwardly in the hole in the body portion 6 from an inner peripheral surface of the outer peripheral wall.

Incidentally, in the rotary table device 1 according to the embodiment, as described above, the cylinder portion 8 is mounted on the body portion 6 at a portion (mounting portion) that is situated at an outer peripheral side in the radial direction and that is positioned in the diameter-increasing portion at the hole in the body portion 6 in the aforementioned mounted state. The thickness (size in the axial direction) of the mounting portion is substantially the same as the size of the diameter-increasing portion in the axial direction, and is larger than the thickness of a portion (projecting portion 8a) that is situated inwardly of the diameter-increasing portion 6b. Therefore, the cylinder portion 8 includes an inner peripheral wall 8b that is provided between the mounting portion and the projecting portion 8a. In the mounted state in which the cylinder portion 8 is mounted on the body portion 6, the insertion hole 7 of the frame 7 is defined by the inner peripheral wall 8b of the cylinder portion 8 and an inner peripheral surface of a portion of the body portion 6 excluding the diameter-increasing portion 6b at the hole in the body portion 6.

In the mounted state, the projecting portion 8a of the cylinder portion 8 is disposed closer to the table than the flange 3c of the main shaft 3. In other words, the diameter-increasing portion 6b of the body portion 6 of the frame 5 is formed at the body portion 6 such that the position of the cylinder portion 8, which is mounted on the diameter-increasing portion 6b, is closer to the table than the position of the flange 3c of the main shaft 3 in the axial direction. Therefore, in the radial direction, the cylinder portion 8 is positioned such that the inner peripheral surface forming the through hole opposes a portion (main portion) of the large-diameter portion 3a of the main shaft 3 that is closer to the table than the flange 3c. In addition, since, as described above, the inside diameter of the through hole of the cylinder portion 8 is substantially the same as the outside diameter of the flange 3c, a space whose width in the radial direction is the same as that of the end surface 4 of the flange 3c of the main shaft 3 that is situated at the side opposite to the small-diameter portion is formed between the inner peripheral surface forming the through hole in the cylinder portion 8 and the main portion of the large-diameter portion 3a of the main shaft 3.

With this being assumed, the clamp piston 9 is provided in the insertion hole in the frame 5 such that the clamp piston 9 faces a surface of the projecting portion 8a of the cylinder portion 8 that is at the side opposite to the table (that is, at a side of the bottom surface forming the insertion hole 7) in the axial direction, and such that the clamp piston 9 is positioned between an inner peripheral surface forming the insertion hole 7 in the frame 5 and the large-diameter portion 3a of the main shaft 3 in the radial direction.

More specifically, the clamp piston 9 is an annular member having a through hole. The large-diameter portion 3a of the main shaft 3 is disposed in the through hole in the clamp piston 9. An outer peripheral surface of the clamp piston 9 is fitted to the frame 5 so as to slide-contact the inner peripheral surface forming the insertion hole 7. The clamp piston 9 is provided in the insertion hole in the frame 5 so as to be movable in the axial direction. However, as described above, the clamp piston 9 is disposed so as to face the surface of the projecting portion 8a of the cylinder portion 8 that is at the side opposite to the table in the axial direction, and so as to be positioned at the side opposite to the table relative to the projecting portion 8a of the cylinder portion 8.

As described above, in the radial direction, the clamp piston 9 is provided so as to be positioned between the large-diameter portion 3a of the main shaft 3 and the inner peripheral surface forming the insertion hole 7 in the frame 5. However, in the axial direction, the clamp piston 9 is disposed so as to extend to the flange 3c and the main portion with respect to the large-diameter portion 3a of the main shaft 3, and such that a portion of the clamp piston 9 at the inner peripheral side of the surface of the projecting portion 8a that is situated at the side opposite to the table faces the flange 3c (large-diameter portion 3a) of the main shaft 3. Therefore, the clamp piston 9 is formed such that its through hole has a shape that corresponds to the shape of the large-diameter portion 3a of the main shaft 3.

More specifically, the through hole in the clamp piston 9 is formed such that, with respect to the large-diameter portion 3a of the main shaft 3, the inside diameter of a portion of the through hole that is situated closer to the table than a substantially intermediate portion in the axial direction is slightly larger than the outside diameter of the main portion and is smaller than the outside diameter of the flange 3c; and such that, with respect to the large-diameter portion 3a of the main shaft 3, the inside diameter of a portion of the through hole that is situated closer to the side opposite to the table than the substantially intermediate portion is slightly larger than the outside diameter of the flange 3c. The inside diameter of the through hole at the side opposite to the table increases from the substantially intermediate portion, and a stepped portion 9b is formed at an inner portion of the through hole. In addition, the clamp piston 9 is disposed such that an inner peripheral surface of a table-side portion of the through hole faces the main portion of the large-diameter portion 3a of the main shaft 3 in the radial direction, and such that at least part of the portion of the clamp piston 9 that is situated at the side opposite to the table faces the flange 3c in the radial direction.

Therefore, the clamp piston 9 is formed such that a surface of the stepped portion 9b in the through hole that faces the side opposite to the table faces the end surface 4 of the flange 3c of the main shaft 3 that is situated at the side opposite to the small-diameter portion, and such that, when the position of the clamp piston 9 in the axial direction is displaced towards the side opposite to the table, the clamp piston 9 comes into contact with the end surface 4 of the flange 3c that is situated at the side opposite to the small-diameter portion. The surface of the stepped portion 9b in the through hole of the clamp piston 9 is, like the end surface 4 of the flange 3c of the main shaft 3 at the side opposite to the small-diameter portion, a planar surface orthogonal to the axial direction such that this surface in its entirety comes into contact with the end surface 4 of the flange 3c of the main shaft 3 that is situated at the side opposite to the small-diameter portion.

Further, the clamp piston 9 includes a cylindrical portion 9a that is formed around the through hole at a table-side end surface so as to protrude from the end surface in the axial direction. The cylindrical portion 9a is formed such that, in the axial direction, while the surface of the stepped portion 9b in the through hole in the clamp piston 9 is in contact with the end surface 4 of the flange 3c of the main shaft 3 (large-diameter portion 3a) that is situated at the side opposite to the small-diameter portion, a table-side edge of the cylindrical portion 9a protrudes from the end surface so as to be positioned closer to the table than a surface of the projecting portion 8a of the cylinder portion 8 of the frame 5 that is situated at the side opposite to the table; and, in the radial direction, while the surface of the stepped portion 9b in the through hole of the clamp piston 9 is in contact with the end surface 4 of the flange 3c of the main shaft 3 (large-diameter portion 3a) that is situated at the side opposite to the small-diameter portion, the outside diameter of the cylindrical portion 9a is substantially the same as the inside side diameter of the through hole in the cylinder portion 8 and the outer peripheral surface of the cylindrical portion 9a contacts the inner peripheral surface forming the through hole in the cylinder portion 8.

Therefore, a space that is surrounded by the inner peripheral surface forming the insertion hole 7 in the frame 5, the surface of the projecting portion 8a of the cylinder portion 8 at the side opposite to the table, and a portion of the end surface of the clamp piston 9 other than a portion where the cylindrical portion 9a is formed is closed by the outer peripheral surface of the cylindrical portion 9a at the inner side in the radial direction regardless of the position of the clamp piston 9 in the axial direction. That is, the space is always closed by these surfaces mentioned above. The rotary table device 1 is formed so as to supply an operating fluid into this space. Therefore, the space functions as the pressure chamber 11 to which an operating fluid is supplied for displacing the clamp piston 9. Accordingly, in the rotary table device 1 according to the embodiment, the frame 5 includes the cylinder portion 8 for forming the pressure chamber 11 by combining the clamp piston 9 and the cylinder portion 8 to each other. The pressure chamber 11 is provided such that at least part of the pressure chamber 11 is defined by the cylinder portion 8 and the clamp piston 9.

In the clamping device of the rotary table device 1 according to the embodiment having such a structure, when an operating fluid is supplied from an operating fluid supplying device (not shown) to the pressure chamber 11, the pressure of the operating fluid causes the clamp piston 9 to be displaced towards the side opposite to the table in the axial direction, so that the surface of the stepped portion 9b in the through hole in the clamp piston 9 press-contacts the end surface 4 of the flange 3c of the main shaft 3 that is situated at the side opposite to the small-diameter portion. This causes friction force to be generated between the surface of the stepped portion 9b and the end surface 4 of the flange 3c that is situated at the side opposite to the small-diameter portion, so that the main shaft 3 (table 2) is brought into a clamped state. Therefore, in the clamping device according to the embodiment, the end surface 4 of the flange 3c of the main shaft 3 (large-diameter portion 3a) that is situated at the side opposite to the small-diameter portion is the surface that acts as the clamp surface.

The rotary table device 1 according to the embodiment includes a return disc 10 between the surface of the projecting portion 8a of the cylinder portion 8 that is situated at the side opposite to the small-diameter portion and the end surface of the clamp piston 9 facing this surface of the projecting portion 8a. The return disc 10 connects the cylinder portion 8 and the clamp piston 9 such that they are unrotatable relative to each other, and urges the clamp piston 9 towards the cylinder portion (table) in the axial direction by elastic force. Therefore, when, in the clamped state of the table, the supply of operating fluid to the pressure chamber 11 is stopped, the clamp piston 9 urged by the return disc 10 is displaced from a position at which the table is clamped towards the table in the axial direction. This causes the surface of the stepped portion 9b in the through hole in the clamp piston 9 to separate from the end surface 4 of the flange 3c that is situated at the side opposite to the small-diameter portion, so that the main shaft 3 is brought into an unclamped state.

In the rotary table device 1 described above, in the present invention, a second bearing 12, which is provided separately from the first bearing 17 described above, is provided between the table 2 and the frame 5. The second bearing 12 is provided for directly supporting the table 2 with respect to the frame 5. The second bearing 12 corresponds to what is called a bearing in the present invention. In the embodiment, the second bearing 12 is interposed between the table 2 and the cylinder portion 8 of the frame 5, and the table 2 is supported by the cylinder portion 8 with the second bearing 12 interposed therebetween.

More specifically, in the rotary table device 1 according to the embodiment, the second bearing 12 is provided for supporting a load in the axial direction (thrust direction). A thrust cylindrical roller bearing or the like is used as the second bearing 12. The second bearing 12 is interposed between the frame 5 and the table 2 such that, with the rotation axis of the bearing coinciding with the axis of the main shaft 3, the second bearing 12 contacts a table-side surface of the projecting portion 8a of the cylinder portion 8 of the frame 5, and the table 2 contacts a side of the second bearing 12 that is situated opposite to the projecting portion.

Incidentally, in the embodiment, the thickness of the second bearing 12 is larger than the distance in the axial direction between the table-side surface of the outer peripheral wall of the frame 5 (body portion 6) and the table-side surface of the projecting portion 8a of the cylinder portion 8. In other words, the cylinder portion 8 (projecting portion 8a) of the frame 5 in the axial direction is positioned such that the distance from a table-side end surface of the projecting portion 8a to a surface of the body portion 6 that is situated closest to the table is smaller than the thickness of the second bearing 12. In the rotary table device 1, the table 2 and the frame 5 (the body portion 6) need to be separated from each other so as not to slide-contact with respect to each other. In order to prevent entry of, for example, chips that are produced by processing of a workpiece or due to cutting oil used in cutting the workpiece, this space needs to be sealable by a seal, such as an O ring.

Accordingly, in the rotary table device 1 according to the embodiment, an annular accommodation groove 2d that opens at the other end surface (cylinder-portion-side end surface) of the table 2 is formed in the table 1 whose position in the axial direction is determined while the table 2 is in contact with the second bearing 12. The position of the annular accommodation groove 2d corresponds to the position of the second bearing 12 on the cylinder portion 8 of the frame 5. The accommodation groove 2d has a depth that allows a space between a frame-side end surface of the table 2 and a table-side end surface of the outer peripheral wall of the frame 5 while the table 2 is supported by the second bearing 12 to become like the above-described space between the table 2 and the frame 5. With this being assumed, the second bearing 12 is interposed between the table 2 and the frame 5 such that the second bearing 12 is disposed between a bottom surface forming the accommodation groove 2d and the table-side end surface of the projecting portion 8a of the cylinder portion, and such that part of the second bearing 12 is accommodated in the accommodation groove 2d. The table 2 is directly supported with respect to the frame 5 (cylinder portion 8).

In the rotary table device 1 according to the embodiment, as described above, the surface of the projecting portion 8a of the cylinder portion 8 that is situated opposite to the table forms a portion (one of the inner surfaces) of the pressure chamber 11; and, in the radial direction, the range of existence of the pressure chamber 11 corresponds to the range of existence of the projecting portion 8a of the cylinder portion 8. As described above, the second bearing 12 is provided in contact with the projecting portion 8a of the cylinder portion 8. The position of the second bearing 12 in the radial direction corresponds to the range of existence of the projecting portion 8a. Therefore, in the rotary table device 1 according to the embodiment, the second bearing 12 is positioned within the range of existence of the pressure chamber 11, and at least part of the second bearing 12 is positioned within the range of existence of the pressure chamber 11 in the radial direction.

As described above, the rotary table device 1 according to the present invention uses the clamping device which generates a clamp force by causing the clamp piston 9 that is displaced in the axial direction of the main shaft 3 to be pushed against the clamp surface 4 of the main shaft that faces the table 2, and which allows switching between a clamped state and an unclamped state without changing the position of the table 2 in the axial direction in the clamped state and the unclamped state. Accordingly, the rotary table device 1 according to the present invention is capable of performing both positioning processing and contouring processing. In addition, in the rotary table device 1 having such a structure, as described above, the second bearing 12 is interposed between the table 2 and the frame 5 (cylinder portion 8), and the table 2 is directly supported with respect to the frame 5 with the second bearing 12 interposed therebetween. Therefore, even if, when the processing of a workpiece is performed, a cutting force acts upon the workpiece, the table 2 is almost never tilted, so that a reduction in the processing precision caused by the tilting of the table can be reduced.

In particular, the cutting force that acts upon a workpiece when positioning processing is performed is larger than the cutting force that acts upon a workpiece when contouring processing is performed. When the positioning processing is performed, a moment that acts around the axis crossing the axial direction and upon the table 2 due to the cutting force is large, as a result of which the table 2 tends to tilt. However, according to the above-described structure, even when the positioning processing in which a large moment, such as that mentioned above, acts upon the table 2 is performed, it is possible to minimize the tilting of the table 2. That is, when the positioning processing is performed, a large moment, such as that mentioned above, acts upon the table 2. However, in the above-described structure, when the positioning processing is performed while the table 2 is clamped by the clamping device, a push force of the clamp piston 9 acts upon the clamp surface 4 of the main shaft 3, and the push force acts upon the table 2 as a force that pushes the table 2 towards the second bearing 12 through the main shaft 3. As a result, the table 2 pushes the second bearing 12, and this force is received by the frame 5. Since the second bearing 12 has high supporting rigidity, even when the positioning processing in which a large moment, such as that mentioned above, acts upon the table 2, is performed, it is possible to minimize the tilting of the table 2 as when the contouring processing is performed.

In addition, in the embodiment, a frame-side portion where the second bearing 12 is disposed between the frame 5 and the table 2 corresponds to the cylinder portion 8. Therefore, as described above, in addition to making it possible to minimize the tilting of the table 2, it is possible to minimize flexing of the table 2 itself when positioning processing is performed.

More specifically, in the rotary table device 1 using the clamping device having the above-described structure, when the positioning processing is performed, as described above, when the clamp piston 9 pushes the clamp surface 4, a force acting in the direction of the push force acts upon a portion of the table 2 around the center hole 2a by the main shaft 3. Therefore, the table 2 to which the force has been applied may be flexed such that an inner-side portion of the table 2 in the radial direction is displaced by a larger amount in the direction of the push force in the axial direction than an outer-side portion of the table 2 in the radial direction. In contrast, in the embodiment, the second bearing 12 is disposed between the table 2 and the cylinder portion 8 that is provided for forming the pressure chamber 11 at the inner side of the body portion 6 of the frame 5, and the position where the table 2 is supported by the second bearing 12 is closer to the center of the table 2. Therefore, the table 2 to which the force has been applied is less likely to be flexed in the manner described above, so that it is possible to minimize the flexing of the table 2 itself.

When the frame side where the second bearing 12 is disposed between the frame 5 and the table 2 is defined as the projecting portion 8a of the cylinder portion 8 as described above, the rigidity of the projecting portion 8a of the cylinder portion 8 is lower than those of the other portions (body portion 6) of the frame 5. Therefore, in the case where positioning processing is performed, when, as a result of pushing the clamp surface 4 by the clamp piston 9, a force acts upon the table or a cutting force acts upon a workpiece, and such forces act as large push forces upon the projecting portion 8a through the second bearing 12, it might seem that the projecting portion 8a itself that supports the second bearing 12 is flexed, as a result of which the table 2 is tilted.

However, as described above, the surface of the projecting portion 8a of the cylinder portion 8 that is situated at the side opposite to the table (the side opposite to the surface of the projecting portion 8a that supports the second bearing 12) is a surface that forms part of the pressure chamber 11. When positioning processing is performed, the pressure of operating fluid supplied to the pressure chamber 11 acts upon the surface of the projecting portion 8a that is situated at the side opposite to the table. That is, when the positioning processing is performed, in the axial direction, the push force is applied to the table-side surface of the projecting portion 8a of the cylinder portion 8, whereas the pressure of the operating fluid is applied to the surface of the projecting portion 8a of the cylinder portion 8 that is situated at the side opposite to the table. The pressure of the operating fluid causes the projecting portion 8 to be supported in a direction opposing the push force. Therefore, even if, when the positioning processing is performed, a large push force, such as that mentioned above, acts upon the projecting portion 8a of the cylinder portion 8 that supports the second bearing 12, almost no flexing occurs in the projecting portion 8a. Therefore, even if, in order to reduce the flexing of the table 2, the second bearing 12 is disposed between the table 2 and the projecting portion 8a of the cylinder portion 8, the effect of preventing the tilting of the table 2 is not lost.

Accordingly, when the second bearing 12 is provided between the table 2 and the cylinder portion 8 (projecting portion 8a), almost no flexing occurs in the projecting portion 8a that is supported by such pressure of the operating fluid mentioned above. However, depending upon the position of the second bearing 12 in the radial direction on the cylinder portion 8 (projecting portion 8a), the projecting portion 8a may be flexed when the cutting force that acts upon a workpiece when positioning processing is performed is very large. In contrast, according to the rotary table device 1 of the embodiment, in the structure in which the second bearing 12 is provided between the table 2 and the projecting portion 8a of the cylinder portion 8, in the radial direction, the second bearing 12 is positioned within the range of existence of the pressure chamber, and the cylinder portion 8 receives the push force within the range in which the cylinder portion 8 receives the pressure of the operating fluid. Therefore, even if, as described above, the cutting force that acts upon the workpiece is very large, the flexing of the cylinder portion 8 itself is suppressed, so that the tilting of the table 2 caused by the flexing of the cylinder 8 itself can be suppressed. Consequently, according to the rotary table device 1 of the embodiment, the tilting of the table 2 is suppressed regardless of the magnitude of the cutting force that acts upon the workpiece when the positioning processing is performed, so that it is possible to minimize a reduction in the precision with which the workpiece is processed.

Although, in the forgoing description, an embodiment of a rotary table device for a machine tool according to the present invention is described, the present invention is not limited to the structure according to this embodiment. The following modifications are possible.

As in the embodiment, when the second bearing is disposed between the table and the projecting portion of the cylinder portion, the rotary table device according to the embodiment has a structure in which, in the radial direction, the range of existence of the pressure chamber of the clamping device and the range of existence of the projecting portion of the cylinder portion of the frame that forms the pressure chamber correspond to each other. Therefore, in the radial direction, the second bearing is necessarily disposed within the range of existence of the pressure chamber. However, the structure of the rotary table device including the clamping device that the present invention presupposes is not limited to the structure according to the embodiment. For example, a structure shown in FIG. 3A and a structure shown in FIG. 3B are possible. In the structure shown in FIG. 3A, at a portion of the cylinder portion that is closer to the table than the clamp piston 9, a projecting portion 8a' of the cylinder portion includes a projection that is disposed closer to the main shaft than the pressure chamber 11 in the radial direction. In the structure shown in FIG. 3B, a projecting portion 8a" of a cylinder portion 8" has a portion that is positioned outside the range of existence of a pressure chamber 11" in the radial direction in a structure in which the pressure chamber is formed in a groove, formed in the projecting portion 8a' of the cylinder portion 8', by inserting part of a clamp piston 9' into the groove.

In the rotary table device in which the projecting portion of the cylinder portion of the frame has a portion that is positioned outside the range of existence of the pressure chamber in the radial direction, even if the second bearing is disposed between the table and the projecting portion of the cylinder portion, the second bearing is not necessarily disposed within the range of existence of the pressure chamber in the radial direction as it is in the embodiment. That is, if, in connection with, for example, the structure of the cylinder portion itself and the magnitude of the cutting force when positioning processing is performed, a push force, such as that mentioned above, acts upon the cylinder portion via the second bearing, as long as this does not cause the cylinder portion itself to be flexed by an amount that adversely affects the processing precision, part of the second bearing may be positioned outside of the range of existence of the pressure chamber in the radial direction as shown in, for example, FIG. 3A. In addition, the disposition of the second bearing in the radial direction is not limited that according to the embodiment or that shown in FIG. 3A in which at least part of the second bearing is positioned within the range of existence of the pressure chamber. As long as the cylinder portion is not flexed by an amount that adversely affects the processing precision as described above, the second bearing may be disposed outside the range of existence of the pressure chamber as shown in FIG. 3B.

Although, in the foregoing description, the case in which the second bearing is disposed between the table and the projecting portion of the cylinder portion, which is part of the frame is described, the frame-side portion where the second bearing is disposed between the frame and the table is not limited to the projecting portion of the cylinder portion. That is, if, in connection with, for example, the structure (strength) of the table itself, a push force of the clamp piston acts upon the table through the main shaft during the positioning processing, as long as this does not cause the table to flex by an amount that adversely affects the processing precision, the frame-side portion where the second bearing is disposed may be a portion other than the projecting portion. More specifically, for example, in the rotary table device according to the embodiment, the second bearing may be disposed on a mounting portion of the cylinder portion of the frame (that is, between the mounting portion and the table), or on the body portion of the frame (that is, between the body portion and the table).

Figure 3A:
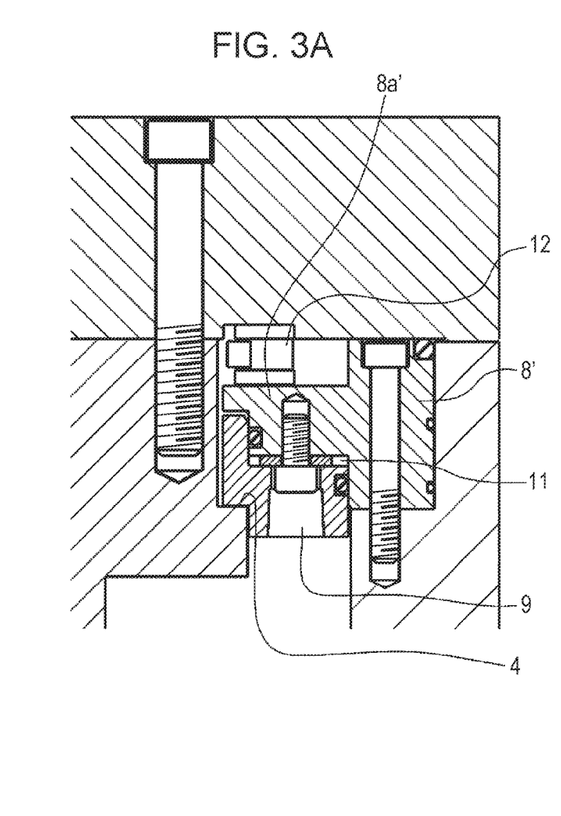
FIGS. 3A and 3B are each a side sectional view of a modification of the rotary table device for a machine tool according to the present invention.
Figure 3B:
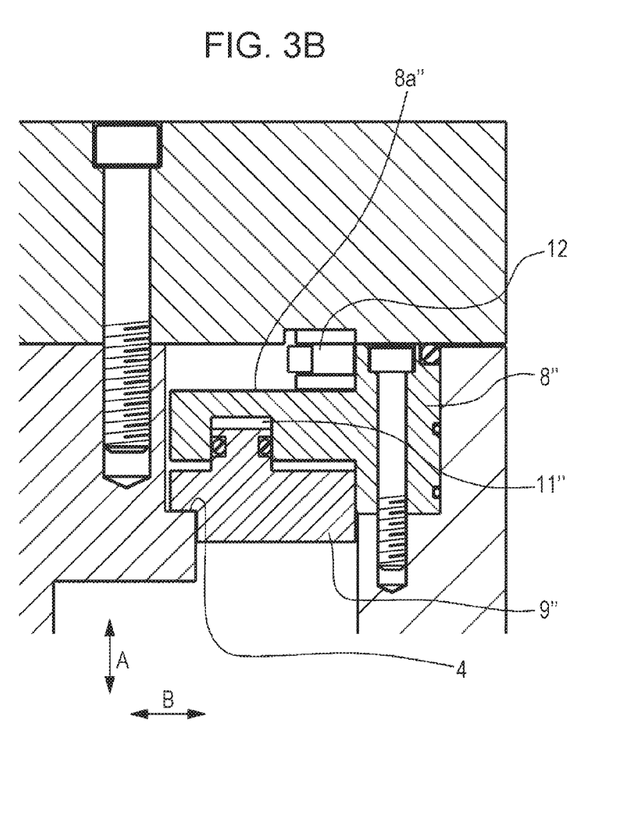

In the embodiment and the modifications shown in FIGS. 3A and 3B, the space, which becomes the pressure chamber, in the clamping device is defined by the clamp piston and the cylinder portion of the frame. In the rotary table device that the present invention presupposes, when the frame includes a cylinder portion for forming the pressure chamber, at least part of the pressure chamber may be defined by the clamp piston and the cylinder portion. When, as in the embodiment and the modification shown in FIG. 3A, one of the surfaces that define the space is part of the frame, this part of the frame may be a portion of the frame other than the cylinder portion.

More specifically, in the structure according to the embodiment and the structure shown in FIG. 3A, the thickness of the mounting portion is greater than the thickness of the projecting portion of the cylinder portion, and, in the axial direction, the mounting portion includes a projection that is disposed closer to the side opposite to the table than the projecting portion. As a result, the inner peripheral surface forming the insertion hole in the frame near the surface of the projecting portion that is situated at the side opposite to the table is formed by an inner peripheral surface of the projection of the cylinder portion. In contrast, for example, in the above-described structure, when the cylinder portion does not include a projection, that is, when the surface of the projecting portion that is situated at the side opposite to the table and a surface of the mounting portion that is situated at the side opposite to the table are flush with each other, the inner peripheral surface forming the insertion hole near the surface of the projecting portion that is situated at the side opposite to the table is formed by the inner peripheral surface of the outer peripheral wall of the body portion while the cylinder portion of the frame is mounted on the body portion. In addition, in this structure, one of the surfaces that define the pressure chamber is a surface of the body portion, and the pressure chamber is formed by the cylinder portion of the frame, the clamp piston, and the body portion of the frame.

In the foregoing description, examples in which the present invention is applied to the rotary table device having a structure in which the pressure chamber and the clamp piston of the clamping device are provided so as to surround the main shaft, that is, a structure in which the clamping device is provided at the outer side of the main shaft in the radial direction and, thus, in which the cylinder portion of the frame is positioned at the outer side of the main shaft in the radial direction have been described. However, the present invention is applicable to a rotary table device, such as that shown in FIG. 4, having a structure in which the clamping device (clamp piston and pressure chamber) are provided at the inner side of the main shaft in the radial direction.

Figure 4:
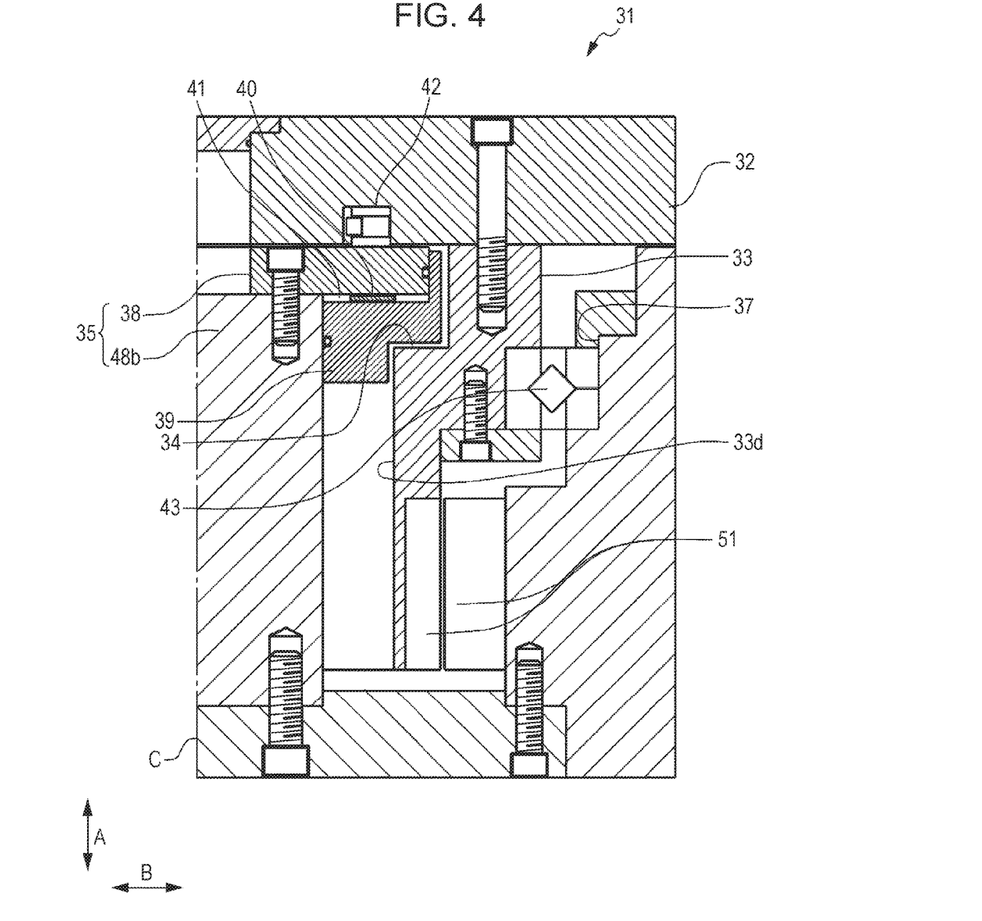
FIG. 4 is a side sectional view of another modification of the rotary table device for a machine tool according to the present invention.

More specifically, although a main shaft 33 of the rotary table device 31 shown in FIG. 4 is a cylindrical shape as in the embodiment, the inside diameter of a through hole 33*d* is one that allows, for example, a clamp piston 39 to be disposed between a shaft portion 48*b* and an inner peripheral surface forming the through hole 33*d*. A clamp surface 34 of the main shaft 33 is provided so as to face a table 32 in the through hole 33*d*.

With this being assumed, compared to the structure according to the embodiment, a cylinder portion 38 and the clamp piston 39 are symmetrically disposed in the radial direction in this structure. More specifically, in the through hole 33*d* of the main shaft 33, the cylinder portion 38 is provided so as to be mounted at its inner peripheral portion in the radial direction on a frame 35 (the shaft portion 48*b* that is positioned in the through hole 33*d*) and so as to extend outward in the radial direction. In addition, in the mounted state, an outer peripheral portion of the cylinder portion 38 faces the clamp surface 34. At a side that is opposite to the table in the axial direction with respect to the cylinder portion 38, an inner peripheral surface of a cylindrical portion of the clamp piston 39 slide-contacts an outer peripheral surface of the cylinder portion 38, and an outer-peripheral-side portion of the clamp piston 39 that is situated at the side opposite to the table faces the clamp surface 34. Therefore, the rotary table device 31 has a structure in which, as a result of providing the cylinder portion 38 and the clamp piston 39 at the inner side of the main shaft 33 in the radial direction, the pressure chamber 41 is also formed at the inner side of the main shaft 33 in the radial direction.

Incidentally, in the rotary table device 31 shown in FIG. 4, the main shaft 33 is, at its outer peripheral surface, rotatably supported with respect to the frame 35 by a cross roller bearing 43 corresponding to the first bearing according to the embodiment. As driving means for rotationally driving the main shaft 33, a direct drive motor (what is called a DD motor 51) is used.

Even in the rotary table device 31 having such a structure, by disposing a second bearing 42 on the cylinder portion 38 of the frame (between the cylinder portion 38 and the table 32) as shown in FIG. 4, the same advantages as those provided by the embodiment are provided. As in the above-described modifications, as long as the second bearing 42 is disposed between the frame 35 and the table 32, the second bearing 42 may be disposed on portions of the frame 35 other than the cylinder portion 38.

In the present invention, the bearing (second bearing) is disposed between the table and the frame. In the embodiment and the modifications shown in FIG. 1 to 4, in disposing the bearing, the table has an accommodation groove that opens to the frame-side (cylinder-portion-side) end surface, and part of the second bearing is accommodated in the accommodation groove. In disposing the bearing according to the present invention, such a structure including this accommodation groove is not required. In a structure in which the table does not include an accommodation groove, the bearing may be disposed between a frame-side surface of the table and a table-side surface of the frame so as to contact the frame-side surface of the table and the table-side surface of the frame.

More specifically, by changing the structure of the frame (such as the disposition of the cylinder portion and the structure of the cylinder portion itself) such that, for example, in the structure according to the embodiment, the distance from a table-side end surface of the cylinder portion to a surface of the body portion that is closest to the table in the axial direction is made larger than that according to the embodiment, and less than the thickness of the second bearing by a distance corresponding to the distance between the table and the frame of the rotary table device according to the embodiment, the second bearing can be disposed between the frame (cylinder portion) and the table without forming an accommodation groove in the table.

Further, the present invention is not limited to above-described embodiment and modifications, and can be modified as appropriate without departing from the gist of the present invention.

What is claimed is:

1. A rotary table device for a machine tool comprising:
a main shaft that is rotatably supported with respect to a frame by a first bearing in an insertion hole formed in the frame;
a table that is secured to an end side of the main shaft, and on which a workpiece, which serves as an object to be processed, is mounted; and
a clamp piston that is provided so as to be movable in an axial direction of the main shaft in the insertion hole,
wherein the main shaft has a clamp surface that faces the table,
wherein a pressure chamber is defined by the frame and the clamp piston,
wherein the table is brought into a clamped state by friction force that is generated between the clamp piston and the clamp surface by causing the clamp piston to press-contact the clamp surface when an operating fluid is supplied to the pressure chamber,
wherein the rotary table device further comprises a second bearing that is provided separately from the first bearing, the second bearing being provided between the table and the frame so as to contact the table and the frame, and being provided so as to directly support the table with respect to the frame, and
wherein at least part of the second bearing is provided so as to be positioned within a range of existence of the pressure chamber in a radial direction of the main shaft.

2. The rotary table device according to claim 1, wherein the frame includes a body portion that is mounted on the machine tool and a cylinder portion that is secured to the body portion so as to be positioned between the table and the clamp piston in the axial direction in the body portion,
wherein at least part of the pressure chamber is defined by the clamp piston and the cylinder portion, and
wherein the second bearing is provided between the table and the cylinder portion, and the table is supported by the cylinder portion of the frame with the second bearing interposed between the table and the cylinder portion.

3. A rotary table device for a machine tool comprising:
a main shaft that is rotatably supported with respect to a frame by a first bearing in an insertion hole formed in the frame;

a table that is secured to an end side of the main shaft, and on which a workpiece, which serves as an object to be processed, is mounted; and a clamp piston that is provided so as to be movable in an axial direction of the main shaft in the insertion hole, wherein the main shaft has a clamp surface that faces the table, wherein a pressure chamber is defined by the frame and the clamp piston, wherein the table is brought into a clamped state by friction force that is generated between the clamp piston and the clamp surface by causing the clamp piston to press-contact the clamp surface when an operating fluid is supplied to the pressure chamber, wherein the rotary table device further comprises a second bearing that is provided separately from the first bearing, the second bearing being provided between the table and the frame and in direct contact with the table and the frame, the second bearing directly supporting the table with respect to the frame, and wherein at least part of the second bearing is provided so as to be positioned within a range of existence of the pressure chamber in a radial direction of the main shaft.

* * * * *